Jan. 18, 1955  K. A. NILSSON  2,699,802
DEVICE FOR SEALING OPEN TUBE ENDS OR THE LIKE
Filed April 4, 1952
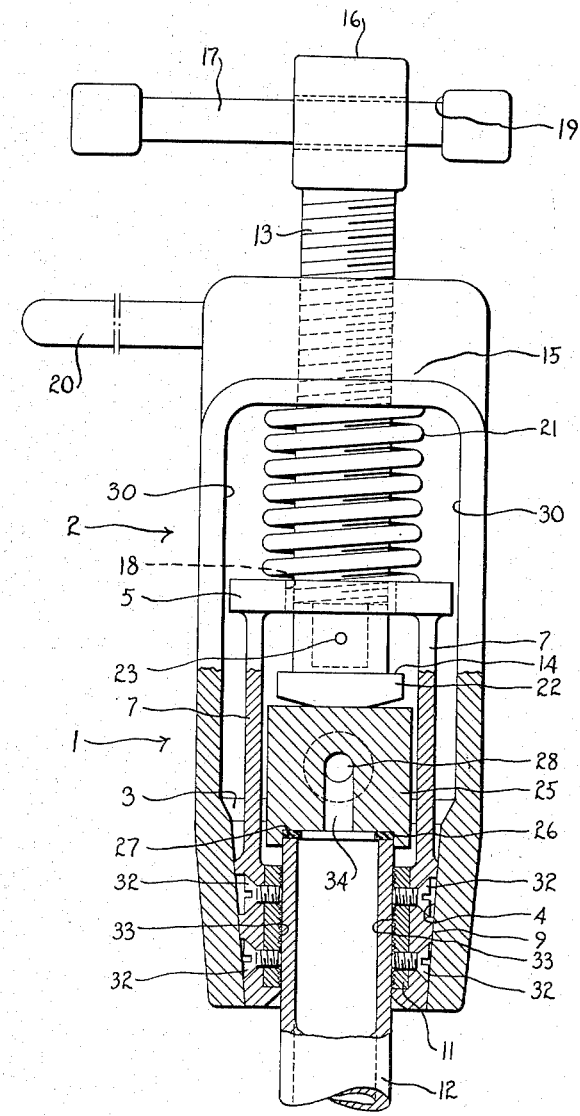
Inventor
Karl Alfred Nilsson Patented Jan. 18, 1955

2,699,802

DEVICE FOR SEALING OPEN TUBE ENDS OR THE LIKE

Karl A. Nilsson, Kolsva, Sweden, assignor to AB Svenska Maskinverken, Sodertalje, Sweden, a corporation of Sweden Application April 4, 1952, Serial No. 280,564

Claims priority, application Sweden April 16, 1951

7 Claims. (Cl. 138—90)

This invention relates to so-called pipe testing plugs, and refers more particularly to a device for sealing an open end of a tube or pipe while permitting fluid under high pressure to be fed thereto for testing purposes.

In pre-operational pressure tests of boilers and the like it is usually necessary to clamp some sort of sealing device on the open end of each of a large number of boiler tubes. These tubes are then subjected to fluid under high pressure, and it is obvious that the sealing devices must not only provide a perfect seal but must also be securely clamped to the tubes to prevent them from being blown off in response to the very high fluid pressures obtaining in the tubes during the test.

The device or tool by which the tube ends are thus sealed normally comprises a plug, which engages over the open end of the tube to effect the seal, and some means for pressing the plug in place. Heretofore the means commonly employed for this purpose has been so designed that its installation on a tube necessitated two separate operations, the first to secure it to the tube and the second to cause it to exert sealing pressure upon the plug. This two-fold operation was awkward and time-consuming, and was especially troublesome where a large number of the plugging devices had to be installed, as in the case of testing the heating surfaces of a boiler.

By contrast, it is an object of the present invention to provide an improved device for sealing an open end of a tube or pipe, which device may be installed on an end portion of the tube or pipe in one quick, simple operation which not only secures the device to the tube or pipe but also presses the plug against the open end of the tube.

More specifically, it is an object of this invention to provide a pipe plugging device which is secured in place on a pipe to be plugged by simply tightening the grip of a pair of jaws on the pipe, and wherein the force needed to tighten this grip is produced by the same means which presses the plug onto the pipe end.

Still another object of this invention resides in the provision of a simple and effective pipe plug device of the character described comprising a plug member by which the open end of a pipe or tube is sealed and a securement member which holds the plug member in place on the pipe or tube, and wherein the securement member is adapted to grip a plain end portion of a pipe or tube, having no shoulder, flange or thread thereon, with a force which increases substantially in proportion to the sealing force which the securement member exerts upon the plug member to press the latter into sealing engagement with the end of the pipe or tube.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof.

Referring now to the drawing, the reference numeral 1 designates a yoke-like holder comprising an upper U-shaped portion 2 and an integral annular collar portion 3 to which the free ends of the legs of the U are joined. The collar portion has a pair of opposite inner wall surfaces 4 which converge downwardly and which may be either planar or conical.

Between the legs 30 of the U-shaped portion of the holder there is a cross-piece 5 which is lengthwise movable along said legs and has a pair of resilient arms 7 extending downwardly therefrom. Said arms comprise a slotted collet and at their outer or lower parts their remote surfaces 9 engage the converging surfaces 4 of the holder, being tapered to conform thereto. Jaws 11, curved in cross section, are attached to the lower end portions of the resilient arms by means of screws 32, and their inside surfaces are sharply serrated, as at 33. These jaws are intended to be clamped around a tube 12, an end portion of which is inserted between the said jaws, and this clamping action is effected by the wedging coaction between the converging surfaces 4 on the collar portion of the holder and the tapering surfaces 9 on the arms when the cross-piece 5 is pressed downwards to cause the portions 9 to slide along the converging wedge surfaces. By this movement the jaws 11 are swung inwards against the tube wall and engage the same very securely by reason of the serrations 33 which bite into the tube to hold the tool in place thereon.

A screw spindle 13 is journalled in a threaded hole in the bight portion 15 at the top of the holder and extends loosely through a larger hole 18 in the centre of the cross-piece 5. At its upper end the screw spindle is provided with a head 16 having a transverse hole therethrough in which a handle 17 is endwise slidably mounted. Shoulders 19 on the end portions of the handle preclude its displacement out of the spindle. A handle 20 is also attached to the holder 1. A compression spring 21 is coaxially mounted on the screw spindle between the bight portion 15 of the holder and the cross-piece 5, reacting between them to normally hold the lower portions 9 of the resilient arms in contact with the converging surfaces 4.

The screw spindle 13 has a head 22 within the holder which may be slipped over the end of the spindle and fixed thereon by means of a pin 23 or the like. The head includes an upwardly facing shoulder 14 which is adapted to engage the underside of the crosspiece 5 when the jaws are to be opened. Between the head 22 and the two jaws 11 a plug or die 25 of steel or iron or the like is inserted which is provided with a sealing ring 26 and which seals the open end 27 of the tube 12. The plug may be provided with a passage 34 for a pressure medium which is allowed to flow into the tube 12 from a suitable source (not shown) connected with an inlet 28, by way of a passage 34 in the plug in order to subject the tube 12 to the intended inside pressure.

The tool works in the following manner. When the tool is to be placed on the tube the screw spindle 13 which is right-threaded is turned to the left by means of the handle 17 and after a few turns the shoulder 14 engages the cross-piece 5 to raise the same, thereby compressing the helical spring 21 and at the same time releasing the lower end portions of the resilient arms from the pressure exerted thereon by the converging surfaces 4 in the holder. This of course spreads the jaws 11 and permits them to be applied to the tube 12. The screw spindle 13 is now turned to the right and the spring 21 expands, actuating the collet so that the tool is held steadily on the tube. The sealing die 25 is put in its place and the spindle is turned again to the right so that the plug is pressed against the tube end 27. Then the screw spindle 13 is further turned till the pressure exerted on the tube end 27 by the die 25 is sufficient to effect the required seal. At the same time the spring 21 expands further and depresses the cross-piece 5 with the resilient arms 7 which carry the jaws 11 so that a wedge action arises at the cooperating wedge surfaces 4 and 9 on the holder and arms, respectively, with the result that the jaws are strongly pressed against the tube wall and secured to said wall. The die 25 is thus pressed against the tube end 27 at the same time that reaction forces are transmitted to the tube wall. If desired, pressure medium is then supplied to the tube through the inlet 28 and the passage 34.

A special advantage of the tool according to the present invention is that only one motion of the hand is required, that is, a turning of the handle 17, for the securement of the attaching device to the tube element and the application of sealing force to the plug. It must also be noted that the tool can be released from the tube as easily by turning the handle 17 in the opposite direction, as the pressure against the tube as well as the pressure between the jaws and the tube is relieved substantially simultaneously, so that the die and the tube can be removed.

According to the invention the spring 21 may be replaced by a sleeve screwed into the crosspiece and provided with threads both at the exterior and the interior, the screw spindle being in such a case fitted in the said sleeve.

This, however, implies another handle for turning the said sleeve for causing the jaws 9 to be clamped to the tube 12. Although the spring 21 is preferred, owing to its automatic action, such an extra sleeve may be suitable in certain cases. The jaws 11 may be made in one piece with the collet or the lower resilient arm portions 9.

From the foregoing description, taken together with the accompanying drawing, it will be readily apparent that this invention provides a pipe test plug of the character described wherein the securement member which holds the sealing plug in place on the end of a pipe or tube element may be very securely clamped to the tube element by the same operation which effects the application of sealing pressure to the sealing plug.

Having now described my invention, what I claim as new and desire to secure by Letters Patent is:

1. A device for readily removably securing a plug over an open end of a tube or pipe, comprising: a yoke-like body having a pair of rigid side walls connected at one end by a transverse member, said body being adapted to be loosely telescoped over the end portion of a tube or pipe to be plugged; cam surfaces on the side walls of the body facing one another and spaced axially from the transverse member, said cam surfaces converging towards the end of the body remote from its transverse member; a pair of jaw members movable in the body lengthwise thereof and toward and from one another, said jaw members being embraced by the side walls and slidably engaging said converging cam surfaces so that said surfaces translate endwise motion of the body in the direction of its transverse member and relative to the jaw members into movement of the jaw members towards one another, said jaw members having inner gripping surfaces adapted to grippingly engage the wall of a tube or pipe over which the body is telescoped; and means on the transverse member for exerting a force toward the opposite end of the body for pressing a plug on the open end of the tube or pipe and by the reaction to such force urging the jaw members into gripping engagement with the tube or pipe.

2. A device for readily detachably securing a plug over an open end of a tube to close the same, comprising an elongated yoke-like body having a pair of rigid side walls connected at one end by a transverse member, said body being adapted to be loosely telescoped over the end portion of a tube to be plugged; a screw threaded through the transverse member and extending substantially parallel to and intermediate the side walls of the body, the end of said screw between said walls being engageable with a plug to urge the same into sealing engagement with an open end of a tube onto which the body is telescoped; a pair of jaw members confined between the side walls of the body, spaced from its transverse member and having gripping surfaces adapted to grip a tube therebetween, said jaw members being movable lengthwise with respect to the body and toward and from one another; and cooperating wedge surfaces on said jaw members and said side walls of the body converging away from the transverse member of the body and whereby the reaction of the body to the application of sealing force on a plug by means of the screw is translated into converging force upon the jaw members, so that the jaw members will grip the wall of a tube therebetween with a force substantially proportional to the sealing force applied on the plug.

3. A device for readily detachably securing a plug over an open end of a tube to seal the same, comprising: a substantially U-shaped collet a pair of resilient arms extending from a crosspiece, the free end portions of which arms provide a pair of jaws; opposing gripping surfaces on said jaws adapted to grip the opposite sides of a tube therebetween; outer cam surfaces on said arms of the collet converging toward the ends of the arms remote from the cross-piece; a rigid yoke-like body having a pair of elongated, spaced apart, rigid side walls embracing the collet, said side walls being connected at one end by a transverse member and extending substantially parallel to the arms of the collet with the crosspiece of the collet and the transverse member of the body adjacent to one another, the side walls of the body having inner surfaces on the end portions thereof remote from the transverse member which are slidably engaged by said cam surfaces on the collet and cooperate therewith to wedge the jaws toward one another in consequence of relative endwise movement of the body and collet in the direction to separate the crosspiece of the collet and the transverse member of the body; and a screw threaded through the transverse member of the body and extending substantially parallel to and intermediate its side walls, and passing loosely through the crosspiece of the collet, the end of the screw between the side walls of the body being engageable with a plug embraced by the arms of the collet and covering an open end of a tube between the jaws to urge the plug into sealing engagement with the end of the tube and, by the reaction to said force, effect relative endwise movement between the body and the collet in the direction to move the jaws towards one another.

4. The device of claim 3, further characterized by a compression spring reacting between the transverse member of the body and the crosspiece of the collet to urge the body and collet endwise in opposite directions, engaging the cam surfaces on the collet with said surfaces on the side walls of the body so that substantial clamping force may be exerted by the jaws before the screw engages a plug, to thereby facilitate preliminary application of the device upon the tube end.

5. The device of claim 4, further characterized by the provision of a shoulder on the end portion of the screw between the arms of the collet, facing the crosspiece of the collet and engageable therewith to move the collet endwise toward the transverse member of the body when the screw is turned in the direction opposite to that in which it applies force to a plug, such motion of the collet moving the jaws thereof away from wedging engagement with said surfaces on the side walls of the body to separate the jaws and facilitate removal of the device from the tube.

6. A device for plugging an open end of a pipe, comprising: a yoke-like body having spaced apart, rigid side walls connected at one end by a cross bar, said body being adapted to be loosely telescoped over the end portion of a pipe to be plugged; cam surfaces on the side walls of the body facing one another and spaced from the cross bar, said cam surfaces converging towards the end of the body remote from its cross bar; a pair of jaw members movable endwise with respect to the body and toward and from one another between the side walls of the body and slidably engaging the cam surfaces so that endwise motion of the body in the direction of divergence of said cam surfaces thereof relative to the jaw members effects movement of the jaws members towards one another to grip a pipe disposed therebetween; a plug embraced by the side walls of the body and located adjacent to the divergent ends of the cam surfaces to bear against the end of a pipe in the grip of the jaw members; and force producing means reacting between the cross bar of the body and the plug for applying a force in the direction tending to force the cross bar and the plug away from one another and thereby tighten the grip of the jaw members on the pipe and press the plug onto the end of the pipe.

7. The device set forth in claim 6 further characterized by the fact that the plug has a port therein with one end in position to open into a pipe to which the device is applied and its other end in position to be readily accessible for the attachment of a valve or other pipe.

References Cited in the file of this patent

UNITED STATES PATENTS

| Number | Name | Date |
|---|---|---|
| 602,289 | Kemp | Apr. 12, 1898 |
| 833,143 | Wolf | Oct. 9, 1906 |
| 1,284,404 | Manneschmidt | Nov. 12, 1918 |
| 1,644,118 | Florence | Oct. 4, 1927 |
| 2,423,679 | Bethke | July 8, 1947 |
| 2,614,781 | Engel | Oct. 21, 1950 |